United States Patent
Adriaenssens et al.

(10) Patent No.: US 6,537,166 B1
(45) Date of Patent: Mar. 25, 2003

(54) TRANSMISSION UNIT FOR MOTOR VEHICLES, PULLEY USED THEREBY AND METHOD FOR MAKING SUCH A PULLEY

(75) Inventors: Frank Cornelius Maria Adriaenssens, Bertem (BE); Dirk Geert Theo Dominique Degeest, Tienen (BE); Jan Michel Maria Broux, Zonhoven (BE); Valentin Antoine Cops, Diepenbeek (BE)

(73) Assignee: ZF Getriebe N.V. Sint-Truiden, Sint-Truiden (BE)

( * ) Notice: Subject to any disclaimer, the term of this patent is extended or adjusted under 35 U.S.C. 154(b) by 0 days.

(21) Appl. No.: 09/512,308

(22) Filed: Feb. 24, 2000

(30) Foreign Application Priority Data

Feb. 24, 1999 (BE) .............................. 09900119

(51) Int. Cl.⁷ ............................. F16H 9/12; F16H 55/56
(52) U.S. Cl. ............................ 474/8; 474/43; 474/91; 451/11; 451/28
(58) Field of Search ........................... 474/8, 43, 167, 474/91; 451/11, 28; 29/892

(56) References Cited

U.S. PATENT DOCUMENTS

| 4,794,741 | A |   | 1/1989 | van Dijk |
| 4,947,533 | A | * | 8/1990 | Taniguchi et al. ........... 474/8 X |
| 5,033,989 | A | * | 7/1991 | Shimaguchi .................... 474/8 |
| 5,605,513 | A | * | 2/1997 | Van Der Hardt Aberson 474/43 |
| 5,800,299 | A | * | 9/1998 | Lamers et al. ............ 474/91 X |
| 6,068,564 | A | * | 5/2000 | Takahara ..................... 474/12 |

FOREIGN PATENT DOCUMENTS

| EP | 0 381 258 A1 |   | 8/1990 |   |
| EP | 0 574 085 A1 |   | 12/1993 |   |
| GB | 1 549 403 |   | 8/1979 |   |
| JP | 60-252839 A | * | 12/1985 | .................. 474/240 |
| JP | 62-2058 A | * | 1/1987 | ..................... 474/8 |
| JP | 62-274140 A | * | 11/1987 | .................. 474/43 |
| JP | 10-296599 A | * | 11/1998 |   |

* cited by examiner

Primary Examiner—Richard M. Lorence
(74) Attorney, Agent, or Firm—Bacon & Thomas, PLLC

(57) ABSTRACT

Transmission unit for motor vehicles of the type containing a continuous variable transmission (2) consisting of an ingoing shaft (3), a driven shaft (4), two pulleys (5–6) situated on the ingoing shaft (3) and the driven shaft (4) respectively, and an endless transmission element (7) provided between said pulleys (5–6), whereby the above-mentioned pulleys (5–6) each consist of two pulley halves (8–9, 10–11) with conical contact surfaces (12) which can be axially adjusted in relation to one another, such that the transmission ratio between the ingoing shaft (3) and the driven shaft (4) can be continuously altered, whereby the transmission element (7) consists of a lubricated belt which is provided with metal parts (13) having contact surfaces (14) which work in conjunction with the above-mentioned conical contact surfaces (12) of the pulley halves (8–9, 10–11), and whereby the contact surfaces (14) of the parts (13) have a profiling (17), in particular a profiling (17) procuring a thin-film lubrication, wherein the conical contact surfaces (12) of the pulley halves (8–9, 10–11) concerned are polished.

11 Claims, 2 Drawing Sheets

TRANSMISSION UNIT FOR MOTOR VEHICLES, PULLEY USED THEREBY AND METHOD FOR MAKING SUCH A PULLEY

BACKGROUND OF THE INVENTION

The present invention concerns a transmission unit for motor vehicles, a pulley used thereby, as well as a method for making such a pulley.

In particular, it concerns a transmission unit containing a continuous variable transmission, consisting of an ingoing shaft, a driven shaft, two pulleys situated on the ingoing shaft and the driven shaft respectively, and an endless transmission element provided between said pulleys, whereby the above-mentioned pulleys each consist of two pulley halves with conical contact surfaces which can be axially adjusted in relation to one another, such that the transmission ratio between the ingoing shaft and the driven shaft can be continuously altered.

It is known that with such a continuous variable transmission, it is possible to use a transmission element which consists of a lubricated belt which is provided with metal parts having contact surfaces which work in conjunction with the above-mentioned conical contact surfaces of the pulley halves. The metal parts are connected as such by means of flexible elements, such as cords or such.

The belt is lubricated by exposing the belt and/or the pulley halves to oil and/or a cooling liquid. This can be done in any way whatsoever. As described in European patent No. 0.574.085, this can be done for example by squirting the oil and/or the cooling liquid on the transmission element and/or the pulleys by means of one or several feed pipes.

New types of transmission elements have been developed recently whereby the contact surfaces of the parts are provided with a profiling which procure a thin-film lubrication. These profilings are made such that the above-mentioned parts locally penetrate deeper in the oil film situated between the parts and the pulley halves, so that a metal-on-metal contact is obtained locally, as a result of which the risk for the transmission element to slip under a heavy load is minimized.

Further, it is known that a new transmission element must always wear in, whereby the contact surfaces of the above-mentioned parts on the one hand, and the pulley halves on the other hand act on one another and adjust to one another as a result of minor wear, after which there will be practically no wear anymore, or at least the wear which is brought about afterwards is so minor that the life of the continuous variable transmission will exceed the normal life of the motor vehicle.

In transmission units which are equipped with the above-mentioned recent types of transmission elements, it was found, however, that there is often an unstable wear-in, whereby instead of the contact surfaces getting adjusted to one another, these surfaces start acting on one another more and more aggressively, and the roughness on these surfaces remains or even increases. As a result, the transmission unit is strongly subject to wear, so that the aimed life and quality are not achieved.

The invention aims a transmission unit with a transmission element which makes use of the principle of thin-film lubrication, but whereby the above-mentioned disadvantages are excluded with certainty.

SUMMARY OF THE INVENTION

To this end, the invention concerns a transmission unit of the type containing a continuous variable transmission consisting of an ingoing shaft, a driven shaft, two pulleys situated on the ingoing shaft and the driven shaft respectively, and an endless transmission element provided between said pulleys, whereby the above-mentioned pulleys each consist of two pulley halves with conical contact surfaces which can be axially adjusted in relation to one another, such that the transmission ratio between the ingoing shaft and the driven shaft can be continuously altered, whereby the transmission element consists of a lubricated belt which is provided with metal parts having contact surfaces which work in conjunction with the above-mentioned conical contact surfaces of the pulley halves, and whereby the contact surfaces of the parts have a profiling, in particular a profiling procuring a thin-film lubrication, characterized in that the conical contact surfaces of the pulley halves concerned are polished.

As use is made of a combination of a profiled contact surface on the above-mentioned parts and a polished contact surface on the pulley halves, the contact surface of the pulley halves is particularly smooth, and there are no two rough surfaces acting on one another, which finally has for a result that the profiled contact surface of the above-mentioned parts will always smoothly adjust to the contact surface of the pulley halves. This guarantees a stable wear-in.

The profile of the contact surfaces of the above-mentioned parts can be of any nature whatsoever and may for example consist of a punched profile, a corrugated profile or a profile formed of local recesses which are obtained for example by sandblasting the surface concerned.

The conical contact surfaces are preferably polished with a cloth with particles or with a polishing block. In particular, they are preferably polished by means of a rotating polishing movement. Thanks to this rotating polishing movement is obtained a very smooth surface. In the case where there are nevertheless roughnesses, they do not extend in the sense of rotation of the pulleys, which has for a result that, at the time of the wear-in, the roughnesses on the contact surface of the pulley halves can never co-operate with the profiling on the contact surfaces of the above-mentioned parts, and an unstable wear-in is once more counteracted.

Naturally, the invention also concerns a pulley for realizing the above-mentioned transmission unit, characterized in that it is provided with one or several conical contact surfaces which are polished.

The invention also concerns a method for realizing such a pulley, characterized in that, at the time of the final finishing, the conical contact surfaces are polished with a rotating polishing element.

A polishing element is hereby preferably used which has such a diameter that this polishing element covers the entire or almost entire radial length of the conical contact surface. As the entire radial length is covered at once, the creation of roughnesses is minimized.

It is also preferred that the polishing element, as it carries out a rotating movement around its own axis, is moved over the contact surface of the pulley half to be worked, such according to a circular path in relation to said pulley half.

According to a practical embodiment, the pulley half to be worked is driven in a rotating manner, and the rotating polishing element is represented to the rotating contact surface in a fixed place.

BRIEF DESCRIPTION OF THE DRAWINGS

In order to better explain the characteristics of the invention, the following preferred embodiments are described as an example only without being limitative in any way, with reference to the accompanying drawings, in which.

DETAILED DESCRIPTION OF PREFERRED EMBODIMENTS

Figure 1:
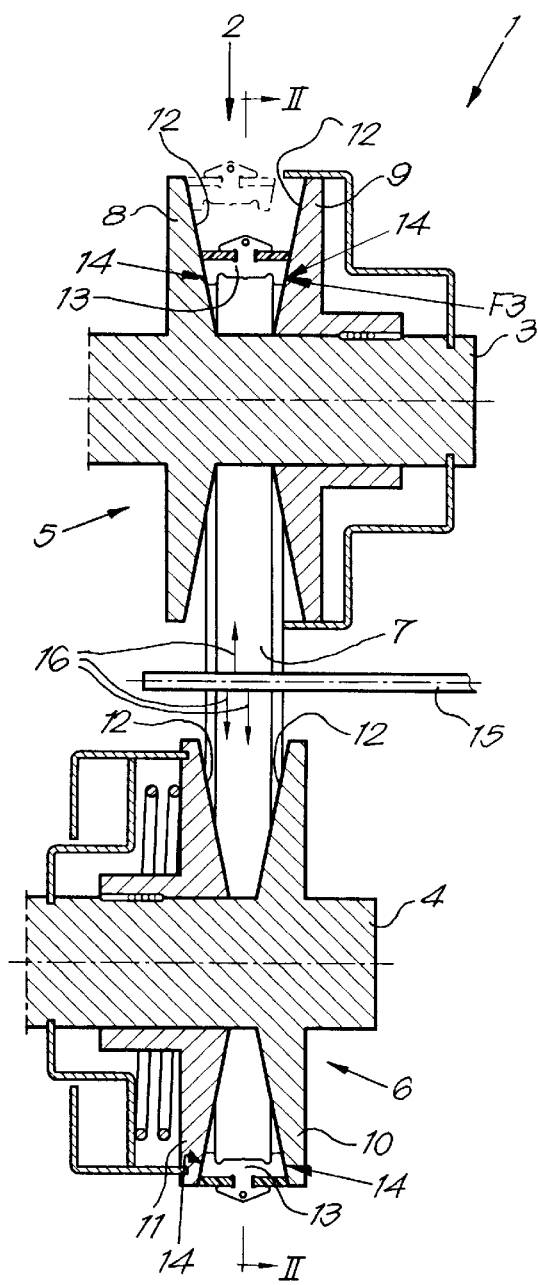
FIG. 1 schematically represents a transmission unit.
Figure 2:
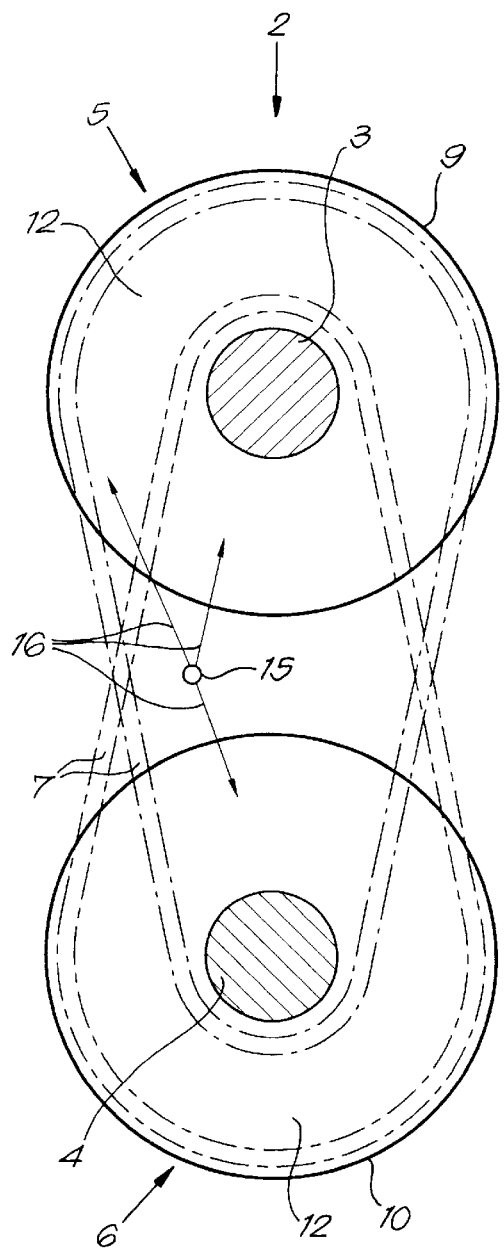
FIG. 2 represents a section according to line II—II in FIG. 1 in a highly schematic manner, in which the two farthest positions of the transmission element are represented.

As represented in the FIGS. 1 and 2, the invention concerns a transmission unit 1 containing a continuous variable transmission 2, consisting of an ingoing shaft 3, a driven shaft 4, two pulleys 5–6 situated on the ingoing shaft 3 and the driven shaft 4 respectively, and an endless transmission element 7 provided between said pulleys 5–6. The pulleys 5–6 each consist of two pulley halves 8–9 and 10–11 with conical contact surfaces 12. The pulley halves 8–9, 10–11 respectively can be axially adjusted in relation to one another, such that the transmission ratio between the ingoing shaft 3 and the driven shaft 4 can be continuously altered.

The above-mentioned transmission element 7 consists of a lubricated belt which is provided with metal parts 13 having contact surfaces 14 which work in conjunction with the above-mentioned conical contact surfaces 12. The lubrication can be carried out in any way whatsoever. In the given example, this is done by means of a belt lubricating pipe 15 via which a number of squirts of oil and/or cooling liquid 16 are squirted on the transmission element 7 and/or on the pulleys 5–6.

Also the metal parts 13 can be linked to one another in any way whatsoever. Examples thereof are sufficiently known from the state of the art and consequently are not further described here.

Figures 3, 4:
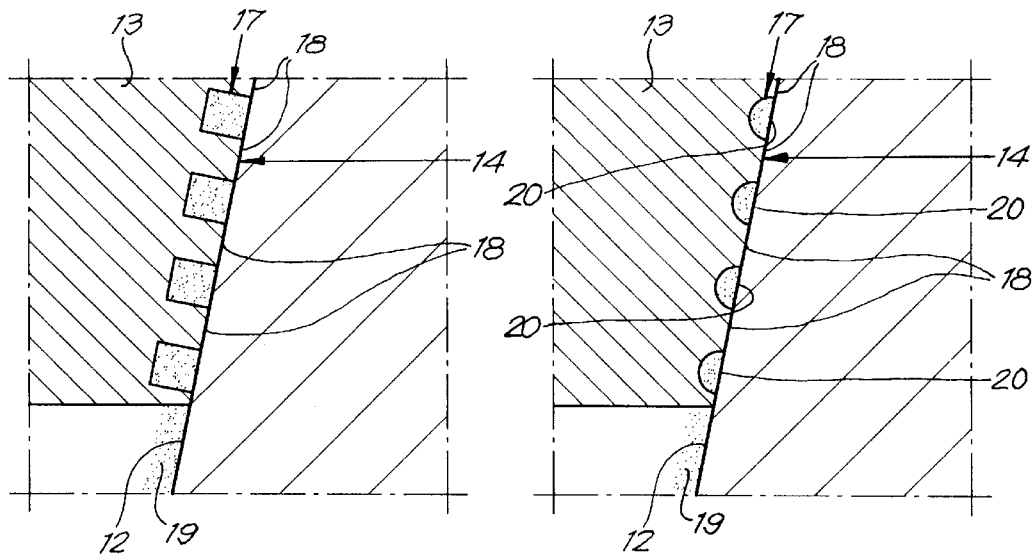
FIG. 3 represents a section to a larger scale on the place which is indicated by arrow F3 in FIG. 1, for an embodiment according to the invention.
FIG. 4 represents a variant of the part which is represented in FIG. 3.

As mentioned in the introduction, the invention specifically concerns embodiments whereby the contact surfaces 14 have a profiling which procures a thin-film lubrication. An example of such a profiling 17 is represented in FIG. 3. Use is hereby made of a corrugated profile, preferably obtained by means of punching. It should be noted that in reality, the roughnesses of this profiling 17 are very small. In a practical embodiment, the ribs 18 will for example have top sides with a width of a few hundreds of a millimeter, whereas they have a height of for example 0.03 mm.

By a thin-film lubrication is meant that the oil film 19 which is present on certain places on the contact surfaces 12 is entirely or almost entirely displaced locally, so that a metal-on-metal contact is obtained and the risk of slipping is minimized. Thanks to the use of a profiling 17 as mentioned above, such a thin-film lubrication is obtained, as the protruding parts of the profiling 17 can easily penetrate in the oil film 19.

The invention is special in that a combination is made of the use of contact surfaces 14 which are provided with such a profiling 17 on the one hand, and the use of contact surfaces 12 which are polished on the other hand. Thus, as explained in the introduction, it is excluded that two profilings, namely the above-mentioned wanted profiling 17 on the one hand, and a profiling due to a too rough finishing of the contact surfaces 12 on the other hand, start acting on one another, as a result of which the wanted profiling 17 would disappear in no time due to wear.

Thanks to the present invention, there will be only a limited wear on the ribs 18 as the transmission unit wears in, such that a stable profile finally remains, for example having a rib height of 0.01 mm, such for the entire life of the continuous variable transmission 2.

As mentioned in the introduction, the profiling 17 can be of any nature whatsoever. As an example is given a profiling 17 with local recesses 20 in FIG. 4, resulting from the sandblasting of the contact surface 14, such in combination with a contact surface 12 which is polished in compliance with the invention.

Figure 5:
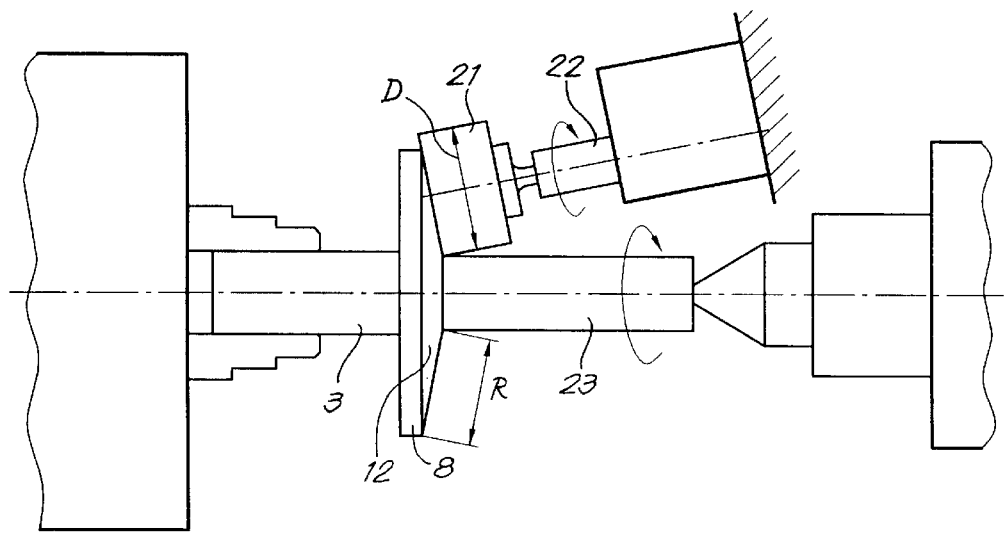
FIG. 5 schematically represents the method according to the invention.

The contact surfaces 12 are preferably polished in a manner as represented in FIG. 5.

The conical contact surfaces 12 are hereby treated with a rotating polishing element 21, in particular a polishing block. This is represented in FIG. 5 for one pulley half, but it is clear that the other pulley halves can be treated in a similar manner.

A polishing element 21 is preferably used hereby, having such a diameter D that this polishing element 21 covers the entire or almost the entire radial length of the conical contact surface 12, whereby the distance indicated by 'R' in FIG. 5 is meant by this radial length.

As represented in FIG. 5, the polishing element 21 is moved over the contact surface 12 of the pulley half to be treated according to a circular path in relation to this pulley half, while carrying out a rotating movement around its own axis 22, which is realized by driving the pulley half to be treated around its axis 23 in a rotating manner, and by representing the rotating polishing element 21 to the rotating contact surface 12 in a fixed place.

It should be noted that by the above-mentioned term 'oil' is implied any type of lubricant and/or cooling medium. By 'metal' parts are understood parts which are exclusively made of metal, as well as parts made of hard materials having a hardness which can be compared to that of the metal parts, as well as parts made of other materials, but whose contact surfaces 12 are made of metal or a material which is comparable as far as hardness is concerned.

Although the contact surface 12 of every pulley half 8–9–10–11 is preferably polished, it is clear that the invention also concerns embodiments whereby only one or a restricted number of the contact surfaces 12 are polished.

The present invention is by no means limited to the above-described embodiments represented in the accompanying drawings; on the contrary, such a transmission unit, the pulleys used thereby and the above-mentioned method can be made in all sorts of variants while still remaining within the scope of the invention.

What is claimed is:

1. A transmission unit for motor vehicles having a continuous variable transmission (2) comprising an ingoing shaft (3), a driven shaft (4), a first pulley (5) positioned on the ingoing shaft (3), another pulley (6) positioned on the driven shaft (4), and an endless transmission element (7) located between said pulleys (5–6), wherein said pulleys (5–6) each include two pulley halves (8–9, 10–11) each having conical contact surfaces (12) arranged to axially adjust in relation to one another and being polished, wherein a transmission ratio between the ingoing shaft (3) and the driven shaft (4) is arranged to be continuously alterable, said transmission element (7) includes a lubricated belt having metal parts (13) with contact surfaces (14) cooperating with said conical contact surfaces (12) of the pulley halves (8–9, 10–11), said contact surfaces (14) of the parts (13) having a profiling (17) with a thin-film lubrication applied thereon.

2. The transmission unit according to claim 1, wherein the contact surfaces (14) of the metal parts (13) are provided with a punched profile.

3. The transmission unit according to claim 1, wherein the contact surfaces (14) of the metal parts (13) have a corrugated structure.

4. The transmission unit according to claim 1, wherein the contact surfaces (14) of the metal parts (13) have a profile with local recesses (20).

5. The transmission unit according to claim 4, wherein the contact surfaces (14) of the metal parts are sandblasted.

6. The transmission unit according to claim 1, wherein the conical contact surfaces (12) are polished with a cloth with particles or with a polishing element (21) in the shape of a polishing block.

7. The transmission unit according to claim 1, wherein the conical contact surfaces (12) are polished by means of a rotating polishing movement.

8. A method for producing the transmission unit for motor vehicles according to claim 1, comprising the step of:

polishing the conical contact surface by means of a rotating polishing element.

9. The method according to claim 8, wherein the polishing element defines an outer diameter and generally covers a radial length of the conical contact surface.

10. The method according to claim 8, further comprising the step of positioning and rotating the polishing element over the contact surface of the pulley half as said pulley half rotates.

11. The method according to claim 10, wherein the polishing element is secured and rotates about an axis of the outer diameter thereof when polishing the contact surface of the pulley half.

* * * * *